April 1, 1952  A. G. DEAN  2,591,654
PANEL JOINT SUPPORT
Filed June 23, 1948
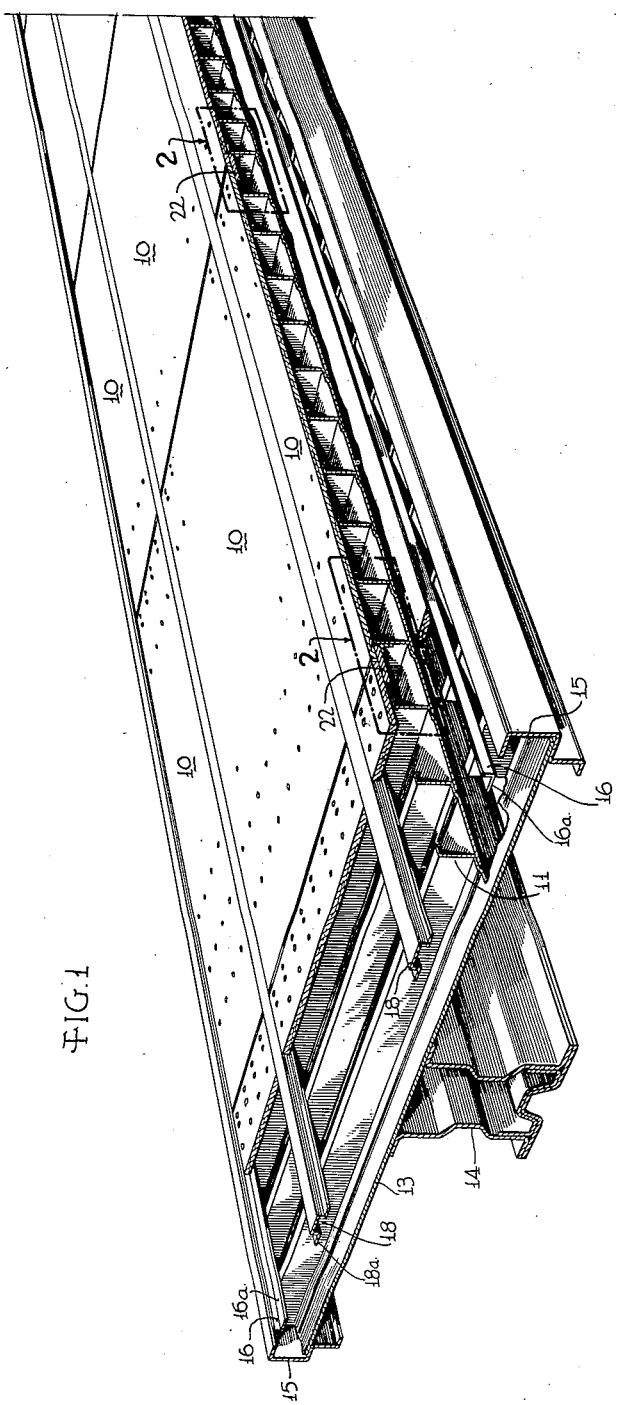
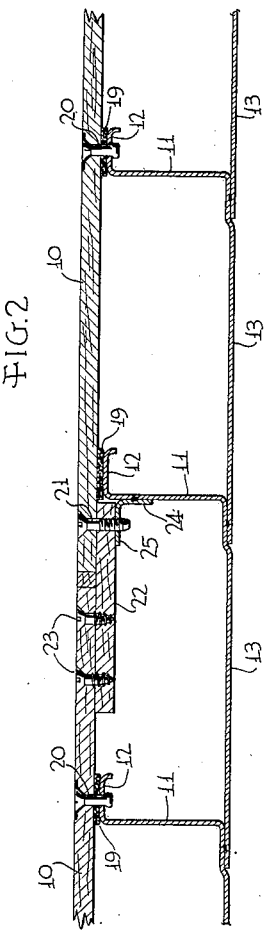
INVENTOR.
Albert G. Dean
BY
Maurice A. Crews
ATTORNEY Patented Apr. 1, 1952

2,591,654

UNITED STATES PATENT OFFICE 2,591,654

PANEL JOINT SUPPORT

Albert G. Dean, Narberth, Pa., assignor to The Budd Company, Philadelphia, Pa., a corporation of Pennsylvania Application June 23, 1948, Serial No. 34,771

2 Claims. (Cl. 189—34)

This invention relates to panel joints and supports, particularly to joints for floors and the like which are subject to heavy loadings, and has for an object the provision of improvements in this art.

The construction is especially suitable for railway car use and is illustrated in this connection but this is not to be considered as a limitation since it is obviously adapted as well for aircraft, buses and other vehicles as well as for fixed buildings.

One of the particular objects of the invention is to provide a panel joint which furnishes full beam strength across the joint whereby all sagging near the joint is avoided.

Another object is to provide a panel joint which is suitable for use on frame members having narrow supporting surfaces.

Another object is to provide a panel joint which can be readily installed on frame members of standard size and spacing, there being provided an auxiliary frame member which can be attached to a standard frame member at any place where a joint is desired.

And another object is to provide a joint and support construction which can be readily and economically installed.

The above and other objects and the advantages of the invention will be apparent from the following description of an illustrative embodiment, reference being made to the accompanying drawings, wherein:

Figure 1 is a perspective plan and section of a rail car floor embodying the invention; and Figure 2 is a vertical longitudinal section on a larger scale of the regions surrounded by dot-and-dash lines 2 of Fig. 1.

The panels 10 are supported on frame members 11 which, for the sake of lightness, have only narrow panel-supporting flanges 12. The cross members 11 may be integral with floor pans 13 which are supported by a center sill 14 and side rails 15 which are tied in with the side wall of the car (not shown).

Metal runners 16 and 18 may be welded to the top flanges 12, the runners 18 and side supports of suitable type (not shown) being adapted to support the bases of seats which are secured in the car. The base flanges 18a of the runners 18 and the base flanges 16a of the runners 16 support the side edges of the panels 10.

The panels 10 may be formed of plywood and may be separated from the flanges 12 by a cloth or cork tape 19 to minimize wear and noise. The panels may be secured to the flanges by rivets 20 which are provided with enlarged heads and sunken washers to give large area of securement, and their lower ends are headed beneath the metal flanges 12. A rivet known commercially as the Cherry rivet may be used. Or, if desired, a tapped or self-tapping screw 21 may be used. This likewise may have a large washer bearing and has the advantage that it may readily be turned to take up for shrinkage of the floor.

At the joint, which is made to be located at one side of a cross member 11 and of an auxiliary member 24 thereon, a splice batten 22 is provided. This is attached beneath one panel 10, as by screws 23, before the panel is put down. Preferably glue is used on the lapped surfaces. After being put on, the other end of the batten 22 is secured to the projecting end of the adjacent panel 10, as by suitable screws 21. In the preferred form shown, an auxiliary angle member 24 is welded to the straight side of the cross member 11 with its flange 25 in position to support the batten 22. The screw 21 in this case is tapped into the flange 25 or some part carried by it. Self-tapping screws have been found satisfactory here. While at the joint no fastener is shown in the flange 12 because the one in the flange 25 is usually adequate, one may be provided if desired.

The joint between the ends of the panels 10 may be filled by plastic putty or other suitable material to provide a smooth uninterrupted surface.

It is apparent that the supplemental angle 24 with its flange 25 may be readily installed at desired joint locations. The cross members 11 of the previously formed assembly may be made of standard size, spacing and shape without regard to special formations at joint locations. It is also apparent that the batten 22 gives the joint full beam strength and when its end is supported by the flange 25, the batten provides greater than beam strength at the joint. Therefore, all sagging under load is avoided. It is also apparent that this joint and its support may be very rapidly made and require no fitting or special skill for installation.

While one embodiment of the invention has been described specifically, it is to be understood that there may be various other embodiments within the range of the invention.

What is claimed is:

1. A panel joint support, comprising in combination, spaced transverse frame members having bearing surfaces adapted to support panels thereon, panels supported on said bearing surfaces of the frame members, an auxiliary frame member secured to the side of one of said transverse frame members where a point is to be made in said panels, said auxiliary frame member having a bearing surface disposed below the level of the bearing surface of the transverse frame member to which it is secured, a panel joint splice batten having one end supported on the bearing surface of the auxiliary frame member and having its upper surface engaging the under surface of two adjacent panels and underlying the joint space between the ends of the panels, the joint space being located at one side of said transverse frame member and its auxiliary frame member, means securing the panel ends at the joint to said joint splice batten, and means securing the panels to the frame members.

2. A panel joint support, comprising in combination, spaced transverse frame members having bearing surfaces adapted to support panels thereon, panels supported on said bearing surfaces of the frame members, an auxiliary frame member secured to the side of one of said transverse frame members where a joint is to be made in said panels, said auxiliary frame member having a bearing surface disposed below the level of the bearing surface of the transverse frame member to which it is secured, a panel joint splice batten having one end supported on the bearing surface of the auxiliary frame member and having its upper surface engaging the under surface of two adjacent panels and underlying the joint space between the ends of the panels, the joint space being located at one side of said transverse frame member and its auxiliary frame member, means securing the panel ends at the joint to said joint splice batten, and means securing the panels to the frame members, said last-mentioned securing means at the joint location serving also to secure the batten to the panel and to secure both the panel and batten to the auxiliary frame member.

ALBERT G. DEAN.

REFERENCES CITED

The following references are of record in the file of this patent:

UNITED STATES PATENTS

| Number | Name | Date |
|---|---|---|
| 867,330 | Young | Oct. 1, 1907 |
| 1,603,366 | Upson | Oct. 19, 1926 |
| 1,679,914 | Murray | Aug. 7, 1928 |
| 1,681,286 | Fasshauer | Aug. 21, 1928 |
| 1,697,800 | Treiber | Jan. 1, 1929 |
| 1,855,082 | Young | Apr. 19, 1932 |
| 1,972,570 | Moore | Sept. 4, 1934 |
| 1,988,314 | Higley | Jan. 15, 1935 |